2,963,403
DEFOAMED SURFACE-ACTIVATED MONOCALCIUM NOVOBIOCIN COMPOSITIONS

Everett N. Hiestand, Portage Township, Kalamazoo County, Mich., assignor to The Upjohn Company, Kalamazoo, Mich., a corporation of Michigan No Drawing. Filed Nov. 1, 1956, Ser. No. 619,664

5 Claims. (Cl. 167—82)

This invention relates to therapeutic compositions and more particularly relates to a pharmaceutically elegant aqueous suspension of calcium acid novobiocin.

Novobiocin is rapidly becoming a valuable addition to the antibiotic armamentarium available to the practicing physician. It is obviously desirable, therefore, that suitable aqueous suspensions of this antibiotic be prepared for oral use. Although calcium acid novobiocin is unusually well suited therapeutically for this purpose, it has been unusually difficult to prepare a pharmaceutically elegant suspension of this material. The difficulties encountered in preparing such an aqueous suspension include air entrapment, formation of a viscous foam, and flocculation. This leads not only to an unsuitable pharmaceutical preparation from the standpoint of appearance, but it also means that proper dosage of the active ingredient cannot be assured since the active ingredient is not uniformly dispersed throughout the aqueous vehicle.

It has now been discovered that a specific surfactant will permit good wetting of calcium acid novobiocin and make possible the preparation of a pharmaceutically elegant aqueous suspension thereof.

It is therefore an object of the present invention to provide a pharmaceutically elegant aqueous suspension of calcium acid novobiocin which is suitable for oral therapeutic use. Other objects will be apparent to one ordinarily skilled in the art to which this invention pertains.

The foregoing and additional objects have been accomplished by the provision of a therapeutic composition comprising, as the essential active ingredient, calcium acid novobiocin, and, as a primary surfactant therefor, a water soluble, pharmaceutically acceptable salt of lauryl sulfuric acid. Exemplary cations for such a salt include aluminum, ammonium, calcium, magnesium, potassium, and sodium. Sodium lauryl sulfate is preferred. Calcium acid novobiocin has the following formula:

wherein NO is the novobiocin anion. Another name for this compound is monocalcium novobiocin. It is more fully described in copending U.S. application Serial No. 557,965, filed January 9, 1956.

It is emphasized that although a vast number of other surfactants and combinations of surfactants have been used for this purpose, only the herein described salts of lauryl sulfuric acid will enable adequate wetting of calcium acid novobiocin and thereby permit the preparation of a suitable aqueous suspension. When other surfactants are used with the powdered novobiocin salt only a very small degree of wetting occurs. If stirred into the liquid phase containing either no or a less active surfactant, the powder will carry with it much entrained air. This solid, with an absolute density greater than the liquid phase but made buoyant by the entrained air, will rise to the surface and form a thick heterogeneous layer resembling a viscous stable foam.

Thus, manufacturing an aqueous suspension of the novobiocin salt is complicated by air entrainment and the formation of a viscous foam containing unwet solids. Days of stirring are required to remove this viscous foam. However, removing the entrained air by stirring does not produce a wholly satisfactory product. It is necessary that the product be labeled "shake well before using" to assure that the active ingredient is uniformly dispersed throughout the vehicle prior to the withdrawal of a single dose. The air will tend to return to the suspension containing poorly wet solids every time it is shaken prior to use. Thus, prolonged stirring during the manufacturing process will not solve the problem of entrained air.

Obviously, flocculation of the solids in any fluid suspension is undesirable, and it is no less undesirable in aqueous suspensions of calcium acid novobiocin. It not only leads to an unsightly preparation, but it also hinders uniformity in dosage.

A large number of surfactants have been used unsuccessfully in attempts to overcome these difficulties. Thus far, only a lauryl sulfuric acid salt will adequately wet calcium acid novobiocin. Illustrative wetting agents which have been used, both individually and in combinations, but were unsatisfactory, include the following: polyoxyethylene stearate (Myrj 52, Atlas Powder Company); sodium lauryl sarcosinate; sodium stearate; dioctyl ester of sodium sulfosuccinate acid (Aerosol OT, Antara Chemical Division of General Aniline and Film Corporation); sodium lignosulfonate (Marasperse N, Marathon Corporation); a mixture of ethylene cycloimides 1-alkyl 2-hydroxyethylene, sodium alcoholate, and methylene-sodium-carboxylate (Miranol HM Conc., Miranol Chemical Corporation); pelargonic acid; diacetyl tartaric acid ester of fatty acid and mono and diglycerides (Solvit A, Emulsol Corporation); sodium salt of protein hydrolysate (Protean W, Protean Chemical Corp.); sorbitan mono-laurate (Span 20, Atlas Powder Company), sorbitan mono-oleate (Span 80, Atlas Powder Company), sorbitan trioleate (Span 85, Atlas Powder Company), polyoxyethylene sorbitan monolaurate (Tween 20, Atlas Powder Company), polyoxyethylene sorbitan monopalmitate (Tween 40, Atlas Powder Company), polyoxyethylene sorbitan monooleate (Tween 80, Atlas Powder Company), polyoxyethylene sorbitan trioleate (Tween 85, Atlas Powder Company), glycerine, propylene glycol, polyglyceride ester of a fatty acid (Emcol 14, Emulsol Corporation), sodium sulfoacetates of mono and diglycerides (Emargol, Emulsol Corporation), glycol stearate (Monoflake, Carlisle Chemical Works, Inc.), ethylene oxide propylene glycol polymer with a hydrophobic base (Pluronic F–68, Wyandotte Chemical Corporation), propylene glycol monolaurate, triglycerol monolaurate, alkyl aryl polyether alcohol (Triton WR–1339, Rohm and Haas and Company), polyethylene glycol 400, modified lecithins (Alcolec Granules, Alcolec MS–10, Alcolec MS–12, Alcolec DS–12, Alcolec 4135, and Alcolec WDR, American Lecithin Company), lecithin, tragacanth, sea plant extract colloids (Sea Kem Type I and Sea Kem Type 3, Seaplant Chemical Corp), sodium carboxymethylcellulose, methylcellulose, acacia, silicone (G.E. Antifoam 60, General Electric Company), and Dow Corning silicone XC–100.

However, although the primary surfactant of the present composition is suitable to quickly wet the insoluble novobiocin salt, the liquid-air interface of the suspensions containing this agent may still possess properties that cause some foam formation. For example, foam formation is characteristic of water solutions containing sodium lauryl sulfate alone. Thus, it is desirable that certain other surfactants be used to reduce the stability of this foam. Among the surfactants useful for this purpose are polyoxyethylene sorbitan trioleate (Tween 85, Atlas Powder Company), sorbitan trioleate (Span 85, Atlas Powder Company), sorbitan monooleate (Span 80, Atlas Powder Company), glycerol monostearate (Emcol MST, Emulsol Corporation), and the like. For convenience and clarity, these surfactants will be referred to as secondary surfactants while the lauryl sulfuric acid salt will be referred to as the primary surfactant. The relative concentrations of the secondary surfactants are nearly as important as the type used. Even changes in the concentration of the primary surfactant and the ratio between the primary and secondary surfactants produce marked changes in the rate of foam breaking.

In general, it can be said that the concentration of the primary surfactant should be sufficient to produce rapid penetration of the dry powder by the liquid phase. The desirable concentration of the primary surfactant cannot be specified more exactly since it depends upon the choice of physical characteristics to be imparted to the suspension and the concentrations of the other ingredients. For example, the concentrations of the active ingredient, the sugar, and other surfactants will affect the desirable concentration of the primary surfactant. Also, it has been observed that concentrations of sodium lauryl sulfate in excess of 0.3 percent weight/volume may impart a plastic character to aqueous calcium acid novobiocin suspensions. A yield value is observed after standing a short time. The plastic suspensions prepared with sodium lauryl sulfate exhibit excessively stable foam. However, an elegant suspension with a plastic character can be prepared using combinations of surfactants.

The criticality of the primary surfactant in aqueous suspensions of calcium acid novobiocin can be demonstrated by a simple screening technique. In accord with this screening method calcium acid novobiocin (milled or micronized) is placed in one end of a paraffin coated trough. A water solution or dispersion of the surfactant is placed in the unfilled end of the trough. The rate of penetration of the solution into the dry powder is then observed. The following table illustrates the superiority of the sodium lauryl sulfate over a great many other surfactants as a wetting agent for calcium acid novobiocin.

TABLE I

|  | Conc. Used (in $H_2O$): percent w./v. if solid, percent v./v. if liquid | Result |
| --- | --- | --- |
| Sodium lauryl sulfate (Duponol C)[6] | 1 | 0.3 inch/min.[1] |
| Sodium lauryl sulfate (Duponol C), polyoxyethylene sorbitan monolaurate (Tween 20)[6] | 1, 1 | Do. |
| Sodium lauryl sulfate (Duponol C), polyoxyethylene sorbitan monolaurate (Tween 20), sorbitan trioleate (Span 85) | 1, 1, 0.4 | 0.5 inch/min. |
| Ethylene cycloimides 1-alkyl 2-hydroxyethylene, sodium alcoholate, methylene-sodium-carboxylate (Miranol HM Conc.) | 1 | very slow.[2] |
| Ethylene cycloimides 1-alkyl 2-hydroxyethylene, sodium alcoholate, methylene-sodium-carboxylate (Miranol HM Conc.), polyoxyethylene sorbitan monolaurate (Tween 20) | 1, 1 | Do. |
| Ethylene cycloimides 1-alkyl 2-hydroxyethylene, sodium alcoholate, methylene-sodium-carboxylate (Miranol HM Conc.), polyoxyethylene sorbitan monolaurate (Tween 20), sorbitan trioleate (Span 85) | 1, 1, 0.4 | Do. |
| Ethylene cycloimides 1-alkyl 2-hydroxyethylene, sodium alcoholate, methylene-sodium-carboxylate (Miranol HM Conc.), polyoxyethylene sorbitan monolaurate (Tween 20), sodium lauryl sulfate (Duponol C) | 1, 1, 1 | 0.5 inch/min. |
| Ethylene cycloimides 1-alkyl 2-hydroxyethylene, sodium alcoholate, methylene-sodium-carboxylate (Miranol HM Conc.), polyoxyethylene sorbitan monolaurate (Tween 20), sodium lauryl sulfate (Duponol C), sorbitan trioleate (Span 85) | 1, 1, 1, 0.4 | Do. |
| Sodium lauryl sarcosinate | 1 | very slow. |
| A mixture of the sulfated products of cetyl and stearyl alcohol (Ceramol) | 1 | Do. |
| Sorbitan trioleate (Span 85) | 2 | Do. |
| Polyoxyethylene sorbitan monostearate (Tween 61) | 2 | Do. |
| Polyoxyethylene sorbitan monolaurate (Tween 20) | 2 | ⅜ inch/hr. |
| Polyoxyethylene sorbitan monolaurate (Tween 21) | 2 | very slow. |
| Polyoxyethylene sorbitan monostearate (Tween 60)[6] | 2 | Do. |
| Sorbitan monolaurate (Span 20), polyoxyethylene sorbitan monolaurate (Tween 20) | ⅔, 1½ | slow.[3] |
| Sorbitan monolaurate (Span 40), polyoxyethylene stearate (Myrj 53) | ⅔, 1½ | slow. |
| Polyoxyethylene sorbitan monolaurate (Tween 20), sodium lauryl sulfate (Duponol C)[6] | 1, 1 | 2 inches/min. |
| Ethylene oxide propylene glycol polymer with a hydrophobic base (Pluronic F-68) | 2 | very slow. |
| Polyoxyethylene sorbitan monolaurate (Tween 20), sodium cumeneazo-β-naphthol disulfonate (F. D. and C. Red No. 1)[4] | 2, 1 | slow. |
| Ethylene oxide propylene glycol polymer with a hydrophobic base (Pluronic F-68), polyoxyethylene sorbitan monolaurate (Tween 20), sodium cumeneazo-β-naphthol disulfonate (F. D. and C. Red No. 1) | 1, ½, 1 | very slow. |
| Ethylene oxide propylene glycol polymer with a hydrophobic base (Pluronic F-68), polyoxyethylene sorbitan monolaurate (Tween 20) | 1, 1 | Do. |
| Monosodium novobiocin [5] | 2 | Do. |

[1] Units are in inches/minute of penetration into the dry powder.
[2] Very slow implies a rate less than 0.25 inch per hour.
[3] Slow implies a rate between 0.1 inch per hour and 0.25 inch per hour.
[4] The chemical structure of F. D. and C. Red No. 1 suggests that it might be surface-active.
[5] Monosodium novobiocin is water soluble. Because the negative ion is common to the solid calcium acid novobiocin, it seemed reasonable that the novobiocin ion might be preferentially adsorbed on the solid and, therefore, be a specific surfactant for the calcium salt.
[6] Tween 61 has a somewhat longer polyoxyethylene chain length than Tween 60.

It can be concluded from results given in Table I that sodium lauryl sulfate is a much superior wetting agent to any other tested. Polyoxyethylene sorbitan monolaurate (Tween 20) is the most active of the nonionics.

In preparing a pharmaceutically acceptable aqueous suspension of calcium acid novobiocin, other factors should also be taken into consideration, although they have no direct bearing on the choice of a surfactant therefor. For example, the ease of suspension is directly dependent upon the particle size of the insoluble ingredient, i.e., calcium acid novobiocin. Thus, as the particle size of the insoluble ingredient is increased, its higher specific gravity causes it to settle in the aqueous fluid and suspension becomes more difficult. Pharmaceutically speaking, such a suspension is characterized as being "chalky." As the particle size of insoluble ingredient is decreased, the concentration of the particles in a given volume of fluid becomes greater and tends to limit the quantity of fluid available between each particle. This also amounts to a practical upper limit on the concentration of the insoluble ingredient which can be satisfactorily suspended in an aqueous vehicle. Thus, the desired therapeutic concentration of calcium acid novobiocin must be balanced against the desired physical characteristics of the suspension. In the specific examples of calcium acid novobiocin suspensions illustrated in the present specification, 99 percent of the calcium acid novobiocin particles are less than twenty microns, and 77 percent are less than ten microns. Another factor which should be taken into consideration in preparing a pharmaceutically acceptable suspension of calcium acid novobiocin is pH. A pH approximating neutrality is most desirable. Either an extremely acid or an extremely basic pH would cause crystals of novobiocin to form and thereby tend to produce a chalky suspension. Still another such factor is viscosity. In the specific examples disclosed herein, a viscosity of one to three stokes has proven to be desirable.

The following examples are illustrative of the composition of this invention and are not to be construed as limiting.

Example 1

Fifty gallons of a syrup containing calcium acid novobiocin is prepared from the following types and amounts of ingredients:

Each 5 cc. contains:

| | |
|---|---|
| 0.075% w./v. methylparaben U.S.P. | 5 oz. |
| 0.025% w./v. propylparaben U.S.P. | 1 oz. 293 grs. |
| 0.05% w./v. sodium lauryl sulfate | 3 oz. 148 grs. |
| 0.035% w./v. dye | 2 oz. 147 grs. |
| 0.04% v./v. sorbitan trioleate | 2 oz. 269 minims. |
| 0.01% v./v. polyoxyethylene sorbitan trioleate | 307 minims. |
| (134.38 mg.) calcium acid novobiocin (micronized) (817.5 mcg. acid/mg.) | 13 lbs. 12 oz. |
| Tragacanth powder U.S.P. | 1 lb. 4 oz. |
| 65% w./v. sugar granular U.S.P. | 271 lbs. |
| 0.024% v./v. imitation flavors | 1 oz. 269 minims. |
| Deionized water, q.s. ad | 50 gals. |

The methylparaben, propylparaben and sodium lauryl sulfate are dispersed in 28 gallons, one pint of deionized water. The sorbitan trioleate and polyoxyethylene sorbitan trioleate are mixed, added to the foregoing solution, and stirred until homogeneous (about one hour). The calcium acid novobiocin is added with stirring until it is completely wetted and the foam has subsided. The tragacanth is mixed with about 100 pounds of the sugar and added. The remainder of the sugar is added and stirred until the sugar has dissolved. The suspension is stirred until smooth. The suspension is milled through a colloid mill at a setting of 0.005 inch and screened through an 80 mesh stainless steel screen. The mill is rinsed with deionized water, and the rinsings are added. Sufficient deionized water is added to make a total volume of fifty gallons, and the suspension is mixed well.

Example 2

100 gallons of a drop formulation containing calcium acid novobiocin is prepared from the following types and amounts of ingredients:

Each cc. contains:

| | |
|---|---|
| 0.075% methylparaben U.S.P. | 10 oz. |
| 0.025% propylparaben U.S.P. | 3 oz. 148 grs. |
| 0.1% sodium lauryl sulfate | 13 oz. 154 grs. |
| 0.04% dye | 5 oz. 295 grs. |
| (110 mg.) micronized calcium acid novobiocin (flushed 10%) | 106 lbs. 6 oz. |
| 0.1% sorbitan trioleate | 13 oz. 154 grs. |
| 0.2% tragacanth powder U.S.P. | 1 lb. 10 oz. 308 grs. |
| 58% sugar granular U.S.P. | 484 lbs. |
| Deionized water, q.s. ad | 100 gals. |

The methylparaben, propylparaben, sodium lauryl sulfate and the dye are thoroughly mixed in forty gallons of deionized water. The calcium acid novobiocin is added and mixed until completely wet. The sorbitan trioleate is added and stirred to remove air. The tragacanth is mixed with 84 pounds of sugar and added while mixing. Mixing is continued for a minimum of one hour and the remainder of the sugar is added. The deionized water is added to make a volume of 95 gallons and mixed until the sugar is completely dissolved. The suspension is then processed through a homogenizer. Sufficient deionized water is added to make a total volume of 100 gallons and the suspension is mixed thoroughly.

Example 3

Following the procedure of Example 2, a composition containing potassium lauryl sulfate as the primary surfactant is prepared by substituting it for the sodium lauryl sulfate used in Example 2.

Example 4

Following the procedure of Example 2, a composition containing aluminum lauryl sulfate as the primary surfactant is prepared by substituting it for the sodium lauryl sulfate used in Example 2.

Example 5

Following the procedure of Example 2, a composition containing ammonium lauryl sulfate as the primary surfactant is prepared by substituting it for the sodium lauryl sulfate used in Example 2.

Example 6

Following the procedure of Example 2, a composition containing calcium lauryl sulfate as the primary surfactant is prepared by substituting it for the sodium lauryl sulfate used in Example 2.

Example 7

Following the procedure of Example 2, a composition containing magnesium lauryl sulfate is prepared by substituting it for the sodium lauryl sulfate used in Example 2.

It is to be understood that the invention is not to be limited to the exact details of operation or compositions shown and described, as obvious modifications and equivalents will be apparent to one skilled in the art, and the invention is therefore to be limited only by the scope of the appended claims.

I claim:

1. A therapeutic suspension comprising, as an essential active ingredient, calcium acid novobiocin and, as a primary surfactant therefor, a water soluble, pharmaceutically acceptable salt of lauryl sulfuric acid dispersed in an aqueous vehicle.

2. The suspension of claim 1 in which the salt of lauryl sulfuric acid is selected from the group consisting of the aluminum, ammonium, calcium, magnesium, potassium and sodium salts.

3. A therapeutic suspension comprising, as an essential active ingredient, calcium acid novobiocin and, as a primary surfactant therefor, sodium lauryl sulfate dispersed in an aqueous vehicle.

4. The suspension of claim 3 in which sorbitan trioleate is included as a secondary surfactant.

5. The suspension of claim 3 in which sorbitan trioleate and polyoxyethylene sorbitan trioleate are included as secondary surfactants.

References Cited in the file of this patent

UNITED STATES PATENTS

| | | |
|---|---|---|
| 2,723,938 | Buckwalter et al. | Nov. 15, 1955 |
| 2,762,780 | Kulakow | Sept. 11, 1956 |
| 2,809,168 | Hlavacek | Oct. 8, 1957 |
| 2,931,780 | Steiner et al. | Apr. 5, 1960 |

FOREIGN PATENTS

| | | |
|---|---|---|
| 1,060,811 | France | Apr. 6, 1954 |
| 655,519 | Great Britain | July 25, 1951 |

OTHER REFERENCES

Ekwall et al.: "Acta Endocrinol.," vol. 4, No. 2, 1950, pp. 179–191.

Price: "Detergents," Chem. Pub. Co. Inc., 1952, p. 108.

Atlas: "Atlas Surface Active Agents," Atlas Powder Co., 1948, pp. 42–43.

Cook et al.: "Remington's Practice of Pharmacy," 9th ed., 1948, Mack Pub. Co., pp. 591–595.

Atlas: "Atlas Spans and Tweens," Atlas Powder Co., 1942, p. 1.

Husa: "Pharmaceutical Dispensing," 3rd ed., 1947, Husa Bros., pp. 245–246.

Lyman: "Am. Pharmacy," 1945, J. B. Lippincott, pp. 292–293.